US010416044B2

(12) United States Patent
Mawby

(10) Patent No.: US 10,416,044 B2
(45) Date of Patent: Sep. 17, 2019

(54) TIRE UNIFORMITY IMPROVEMENT THROUGH IDENTIFICATION OF MEASUREMENT PROCESS HARMONICS USING WEIBULL REGRESSION

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH); William David Mawby, Greenville, SC (US)

(72) Inventor: William David Mawby, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 314 days.

(21) Appl. No.: 15/500,185

(22) PCT Filed: Jul. 31, 2014

(86) PCT No.: PCT/US2014/049174
§ 371 (c)(1),
(2) Date: Jan. 30, 2017

(87) PCT Pub. No.: WO2016/018373
PCT Pub. Date: Feb. 4, 2016

(65) Prior Publication Data
US 2017/0241868 A1 Aug. 24, 2017

(51) Int. Cl.
B29D 30/00 (2006.01)
G01M 17/02 (2006.01)
B29D 30/06 (2006.01)

(52) U.S. Cl.
CPC .......... G01M 17/02 (2013.01); B29D 30/0061 (2013.01); B29D 2030/0066 (2013.01); B29D 2030/0635 (2013.01)

(58) Field of Classification Search
CPC ... B29D 2030/0066; B29D 2030/0635; G01M 17/02; G01M 13/028; B60C 23/062; G06F 17/18
(Continued)

(56) References Cited

U.S. PATENT DOCUMENTS 4,458,451 A 7/1984 Rogers
4,889,425 A * 12/1989 Edwards ................ G01B 11/16
356/141.3
(Continued)

FOREIGN PATENT DOCUMENTS

EP 1134573 9/2001
EP 2626684 8/2013
(Continued)

OTHER PUBLICATIONS

PCT International Search Report for corresponding PCT Application No. PCT/US2014/049151, dated Dec. 5, 2014—2 pages.
(Continued)

Primary Examiner — John E Breene
Assistant Examiner — Jeffrey P Aiello
(74) Attorney, Agent, or Firm — Dority & Manning, P.A.

(57) ABSTRACT

Methods and systems for improving the uniformity of a tire are provided. More particularly, a magnitude of a uniformity parameter can be obtained for each tire in a set of a plurality of tires. The magnitudes associated with the set of tires can be transformed according to a probability distribution function (e.g. a Weibull distribution function) to obtain a set of transformed magnitudes. Parameters associated with a probability distribution function can be estimated based at least
(Continued)

in part on the transformed magnitudes. Parameters associated with the probability distribution function can be used to determine data indicative of a measurement error in the uniformity measurements attributable to a measurement process harmonic. The data indicative of the measurement error can be used to correct uniformity measurements obtained for tires and to modify tire manufacture based at least in part on the corrected measurements.

14 Claims, 6 Drawing Sheets

(58) Field of Classification Search
USPC .......................... 73/146; 702/146, 179, 181
See application file for complete search history.

(56) References Cited

U.S. PATENT DOCUMENTS

| | | | |
|---|---|---|---|
| 6,290,388 B1* | 9/2001 | Saul | G01K 7/01 |
| | | | 257/467 |
| 6,405,146 B1 | 6/2002 | Engel | |
| 6,496,834 B1 | 12/2002 | Cereghini et al. | |
| 2003/0112234 A1 | 6/2003 | Brown et al. | |
| 2005/0081614 A1 | 4/2005 | Zhu | |
| 2005/0228650 A1* | 10/2005 | Huang | H04R 25/606 |
| | | | 704/205 |
| 2006/0031024 A1 | 2/2006 | Mountassir | |
| 2009/0063095 A1* | 3/2009 | Bagwell | G06K 9/00147 |
| | | | 702/181 |
| 2011/0185458 A1* | 7/2011 | Kysar | B81C 99/003 |
| | | | 850/19 |
| 2012/0031179 A1 | 2/2012 | Mawby | |
| 2012/0035757 A1 | 2/2012 | Mawby et al. | |
| 2012/0095587 A1 | 4/2012 | Hair, Jr. et al. | |
| 2013/0090879 A1 | 4/2013 | Estor et al. | |
| 2013/0098148 A1 | 4/2013 | Mawby et al. | |
| 2013/0253686 A1 | 9/2013 | Flament et al. | |
| 2014/0350879 A1 | 11/2014 | Takiguchi et al. | |
| 2015/0039630 A1* | 2/2015 | Thomee | G06N 7/005 |
| | | | 707/748 |
| 2015/0300921 A1* | 10/2015 | Nicholson | G01M 17/02 |
| | | | 73/146 |

FOREIGN PATENT DOCUMENTS

| | | |
|---|---|---|
| EP | 2745224 | 6/2014 |
| JP | H10/281913 | 10/1998 |
| JP | 2000/234980 | 8/2000 |
| JP | 2005/186790 | 7/2005 |
| JP | 2006/105775 | 4/2006 |
| JP | 2013/210355 | 10/2013 |
| WO | WO 02/099377 | 12/2002 |
| WO | WO 2013/099984 | 4/2013 |
| WO | WO 2014/092722 | 6/2014 |

OTHER PUBLICATIONS

PCT International Search Report for corresponding PCT Application No. PCT/US2014/049165, dated Nov. 19, 2014—2 pages.
PCT International Search Report for corresponding PCT Application No. PCT/US2014/049170, dated Dec. 5, 2014—2 pages.
PCT International Search Report for corresponding PCT Application No. PCT/US2014/049174, dated Dec. 5, 2014—2 pages.
Friendly et al., "Elliptical Insights: Understanding Statistical Methods through Elliptical Geometry," *Statistical Science*, vol. 28, No. 1, Feb. 2013, pp. 1-40.
Nolan, "Multivariate elliptically contoured stable distributions: theory and estimation," American University, Oct. 31, 2006—17 pages.
Sibley, "Weibull Analysis as a Tool for Yield Analysis and Control Charting," M.A. Sibley Consulting, Feb. 24, 2013—38 pages.
Tentzerakis et al., "Evaluation of Wind Farm Harmonic Current Emissions," European Wind Energy Conference & Exhibition Conference, May 7-10, 2007, Milan, Italy—9 pages.
Boudt et al., "Robust and Explicit Estimators for Weibull Parameters," *Metrika*, vol. 73, Issue. 2, Mar. 2011—27 pages.

* cited by examiner

TIRE UNIFORMITY IMPROVEMENT THROUGH IDENTIFICATION OF MEASUREMENT PROCESS HARMONICS USING WEIBULL REGRESSION

FIELD

The present disclosure relates to tire uniformity and more particularly to improving the uniformity of tires by identification of measurement error due to one or more measurement process harmonics using Weibull regression.

BACKGROUND

Tire non-uniformity relates to the symmetry (or lack of symmetry) relative to the tire's axis of revolution in certain quantifiable characteristics of a tire. Conventional tire building methods unfortunately have many opportunities for producing non-uniformities in tires. During revolution of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

Many different factors can contribute to the presence of uniformity characteristics in tires. Uniformity dispersions in tires can result from both tire harmonic effects and process harmonic effects. Tire harmonic effects or "tire harmonics" have periods of variation that coincide with the tire circumference (e.g. fit an integer number of times within the tire circumference). Tire harmonics can be attributable to tread joint width, out-of-roundness of the building drums, curing press effects, and other effects.

Process harmonic effects or "process harmonics" have periods of variation that do not coincide with the tire circumference (e.g. do not fit an integer number of times within the tire circumference). Process harmonics are generally related to process elements rather than tire circumference. Process harmonic effects can be caused, for instance, by the uniformity measurement machine itself due to non-uniformities in a road wheel used to load a tire during uniformity measurement. The manifestation of a process harmonic can change from tire to tire depending on the rate of introduction of the process harmonic relative to the tire circumference.

SUMMARY

Aspects and advantages of embodiments of the present disclosure will be set forth in part in the following description, or may be learned from the description, or may be learned through practice of the embodiments.

One example aspect of the present disclosure is directed to a method for improving the uniformity of a tire. The method includes obtaining, by one or more computing devices, a set of magnitudes of a uniformity parameter measured for a set of a plurality of test tires. Each magnitude is associated with one of the test tires in the set of test tires. The method further includes transforming, by the one or more computing devices, the set of magnitudes to generate a set of transformed magnitudes and estimating, by the one or more computing devices, one or more parameters of a probability distribution (e.g. a Weibull distribution) from the transformed magnitudes. The method further includes determining, by the one or more computing devices, data indicative of a measurement error attributable to a measurement process harmonic based at least in part on the one or more parameters of the probability distribution. The method further includes modifying tire manufacture based at least in part on the data indicative of the measurement error.

Another example aspect of the present disclosure is directed to a system for improving the uniformity of a tire. The system can include a uniformity measurement machine configured to obtain uniformity measurements of a uniformity parameter a set of a plurality of tires. The system can further include one or more computing devices in communication with the uniformity measurement machine. The one or more computing devices can include computer-readable instructions that when executed by one or more processors cause the one or more processors to perform one or more aspects of any of the methods for improving tire uniformity disclosed herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1A:
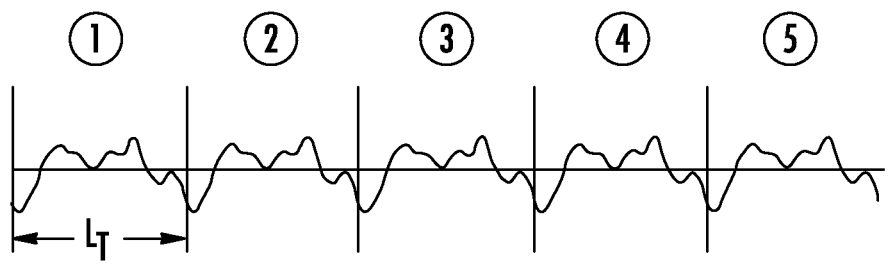
FIG. 1(a) depicts uniformity waveforms associated with tire effects for five representative tires.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to methods and systems for improving the uniformity of a tire. More particularly, a plurality of uniformity measurements can be analyzed to identify contributions to uniformity measurements resulting from a measurement process harmonic. The measurement process harmonic can be a process harmonic effect associated with the acquisition of uniformity measurements of a tire, such as a process harmonic effect associated with one or more process elements (e.g. a road wheel) used during the acquisition uniformity measurement in a uniformity measurement machine. The measurement process harmonic can result solely from the acquisition of uniformity measurements and may not contribute to actual tire non-uniformity. Once identified, data indicative of a measurement error attributable to the measurement process harmonic can be used to correct uniformity measurements obtained for tires. Tire manufacture can then be modified to improve tire uniformity based at least in part on the corrected measurements.

More specifically, a uniformity parameter can be analyzed by obtaining a plurality of uniformity measurements at a plurality of discrete data points for one or more revolutions of the tire. The plurality of uniformity measurements performed at the discrete data points can be collectively represented as a uniformity waveform. The uniformity parameter can be, for instance, radial run out, radial force variation, lateral run out, lateral force variation, static balance, tangential force variation or other suitable uniformity parameter. The uniformity measurements can be represented as uniformity summary data for each tire in the set of tires. For instance, the uniformity summary data can include the magnitude and/or phase angle of one or more harmonics (e.g. Fourier harmonics) of a uniformity parameter of interest, such as the first harmonic of radial force variation.

The uniformity measurements can have contributions from both tire harmonics and process harmonics. A tire harmonic has a period that fits an integer number of times within the tire circumference. Typical tire harmonics can be attributable to tread joint width, out-of-roundness of the building drums, press effects, and other effects. Process harmonics have a period that does not fit an integer number of times within the tire circumference. Typical process harmonics can be caused, for instance, in the preparation of a semi-finished product (e.g. a tread band), by thickness variations due to the extruder control system or by rollers that can deform the shape of softer products.

A process harmonic can be expressed or identified in terms of various parameters, including but not limited to the rate (e.g. frequency or period) of introduction relative to the dimensions of the tire (e.g., tire circumference, radius, diameter, discrete number of data points around the tire or the like). The rate of introduction can also be expressed as a harmonic number (e.g. 1.25, 0.8, etc.). When considering a total number of p candidate process effects, the rate of introduction of each process effect can be defined in terms of its respective harmonic number $h_p$.

A measurement process harmonic is a process harmonic that is attributable to the acquisition of uniformity measurements of a tire, but does not contribute to actual tire non-uniformity. Measurement process harmonics can be effects that appear within uniformity measurements due to process components used in measuring tire uniformity itself. For example, uniformity measurements can be obtained by rotating a tire for one or more revolutions in a uniformity measurement machine. During the acquisition of uniformity measurements, the tire can be loaded with a road wheel. The purpose of the road wheel is to simulate the tire rolling along a surface for measuring uniformity parameters such as radial force variation, lateral force variation, and/or tangential force variation. Non-uniformity in the road wheel can manifest itself in the uniformity measurements obtained for the tire. The non-uniformity of the road wheel, however, does not contribute to the actual non-uniformity of the tire.

Figure 1B:
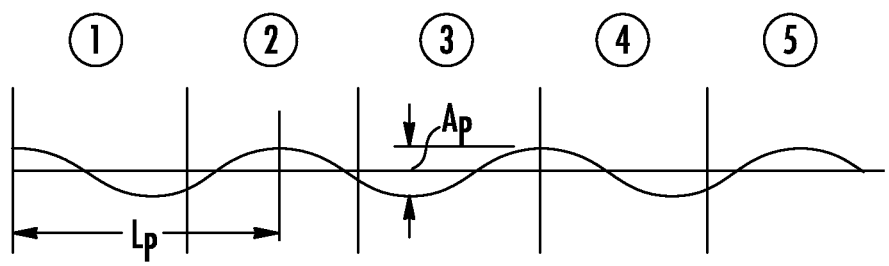
FIG. 1(b) depicts a uniformity waveform associated with a measurement process effect.
Figure 1C:
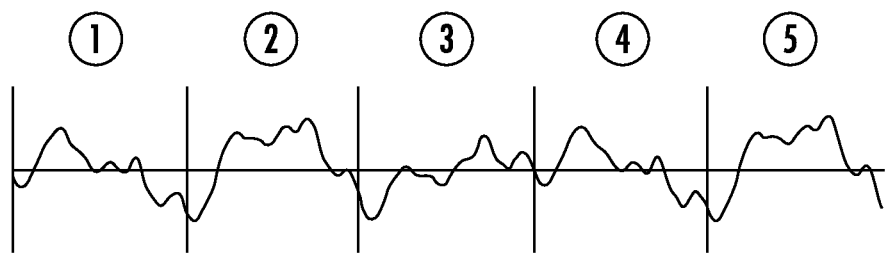
FIG. 1(c) depicts a composite uniformity waveform measured for the five representative tires and combining both the tire effect and process effect.

FIGS. 1(a)-1(c) provide a graphical representation of how a measurement process harmonic can add to existing tire harmonics to cause uniformity variations across a plurality of tires. In FIG. 1(a), the graphic represents uniformity waveforms associated with tire effects for five respective test tires. The uniformity waveform can be, for instance, a radial force variation waveform or other suitable uniformity waveform. Notice that the uniformity waveform associated with the tire effects for each tire is substantially similar. The uniformity waveforms of FIG. 1(a) can be composed of a number of different tire harmonics, each of which fit an integer number of times within the period defined by the circumference of the individual test tires, namely $L_T$.

FIG. 1(b) represents a model of an exemplary measurement process effect that that can affect the uniformity dispersion of the tires. As shown, the measurement process effect has a period $L_P$ that does not fit an integer number of times within the period defined by the tire circumference $L_T$. For the example depicted in FIG. 1(b), the measurement process effect has a period Lp that is approximately 1.5 times the tire circumference, $L_T$. The measurement process effect has a magnitude (e.g. peak to peak amplitude) of $A_P$.

FIG. 1(c) represents the sequential observed (i.e. measured) composite uniformity waveforms for the tires. As shown in FIG. 1(c), it is evident that the addition of a measurement process effect to the tire effects can cause the maximum observed values within the measured uniformity waveform (or particular harmonic components thereof, e.g. the first harmonic of radial force variation) to vary from tire to tire even if all tire harmonics remain constant across the plurality of tires. The estimated magnitude of measurement process effect contributions to an observed waveform can be used to better analyze uniformity measurements and/or to correct various aspects of the tire manufacturing process.

According to example aspects of the present disclosure, tire uniformity can be improved by correcting uniformity measurements for measurement process harmonics. More particularly, a magnitude of a uniformity parameter can be obtained for each tire in a set of a plurality of tires. The magnitudes associated with the set of tires can be transformed according to a probability distribution function (e.g. a Weibull distribution function) to obtain a set of transformed magnitudes. Parameters associated with a probability distribution function (e.g. a Weibull distribution) can be estimated based at least in part on the transformed magnitudes. Parameters associated with the probability distribution function can then be used to determine data indicative of a measurement error (e.g. a variance) in the uniformity measurements attributable to a measurement process harmonic. The data indicative of the measurement error can be used to correct uniformity measurements obtained for tires and to modify tire manufacture based at least in part on the corrected measurements.

For instance, in one example implementation, the set of transformed magnitudes can have a generally linear distribution. As used herein, the term "generally linear" refers to within 30% of a perfect linear relationship. A best fitting line can be estimated for the generally linear distribution using, for instance, a regression analysis. Parameters associated with the linear distribution can be estimated from the best fitting line, such as a slope and intercept of the best fitting line.

The slope and intercept can be used to estimate one or more parameters of a Weibull distribution. A Weibull distribution is a probability distribution that can have various parameters, including a shape parameter and a scale parameter. The shape parameter can be indicative of the shape of the Weibull distribution while the scale parameter can be indicative of the extent of the Weibull distribution. The slope and intercept can be used to estimate a shape parameter and a scale parameter for the Weibull distribution. More particularly, the shape parameter of the Weibull distribution can be estimated based at least in part on the slope. The scale parameter can be estimated based at least in part on the intercept.

Data indicative of a measurement error can be determined based at least in part on the shape parameter and/or the scale parameter of the Weibull distribution. For instance, differences between the estimated shape parameter and the shape parameter of a baseline Weibull distribution can be identified. The baseline Weibull distribution can be associated with an expected distribution of magnitudes for a set of tires. The differences between the shape parameters can be used to estimate data indicative of a measurement error (e.g. a variance attributable to the measurement error).

Tire manufacture can be modified by correcting uniformity measurements based at least in part on the data indicative of the measurement error attributable to the measurement process harmonic. The corrected uniformity measurements can provide a more accurate representation of the uniformity of the tire by cleansing the measurements of any effects attributable solely to measuring uniformity. Use of the corrected uniformity measurements can result in higher uniformity yield and improved process control for tire uniformity.

Example Methods for Improving the Uniformity of a Tire

Figure 2:
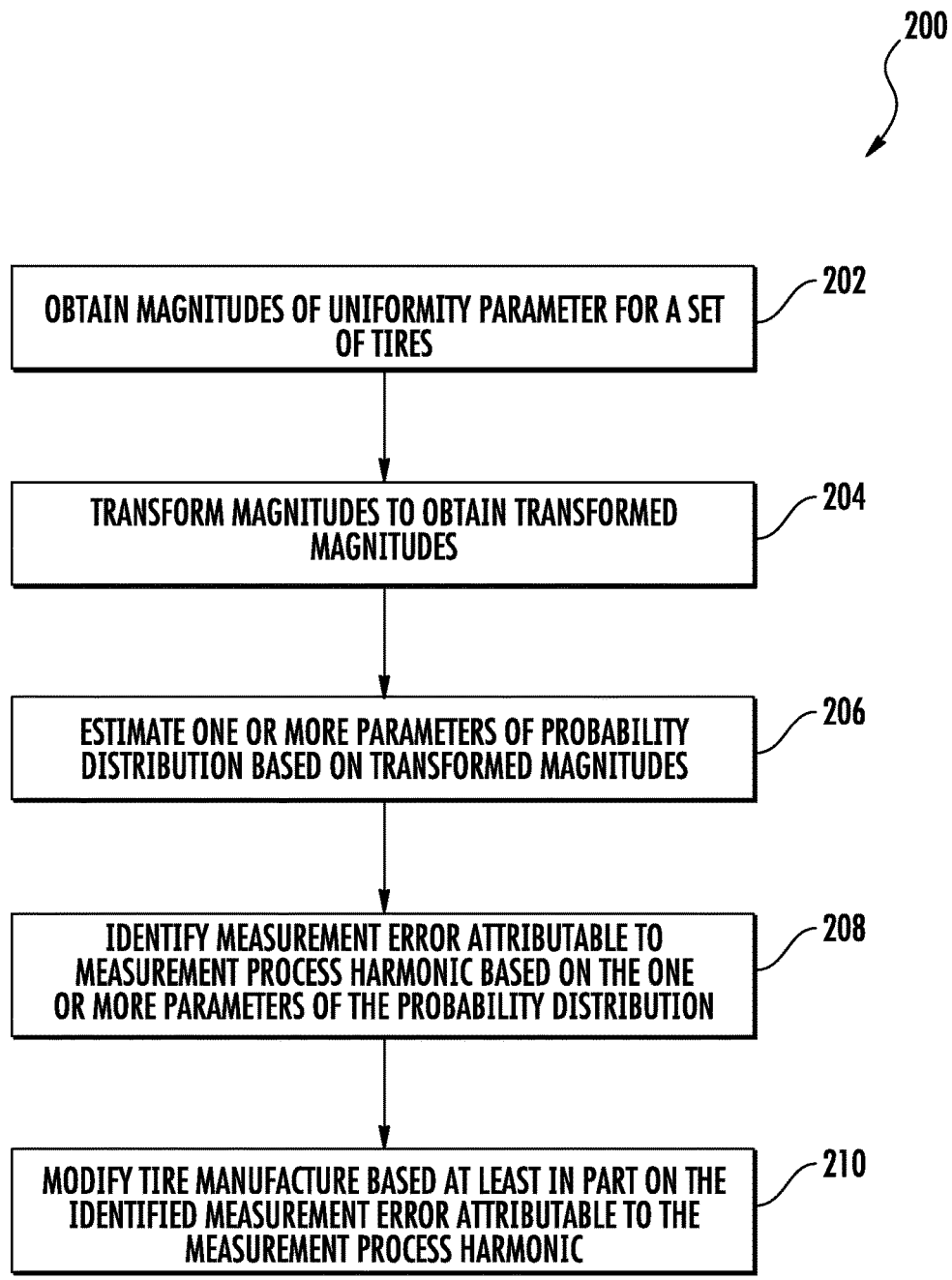
FIG. 2 depicts a flow diagram of an example method for improving tire uniformity according to example aspects of the present disclosure.

FIG. 2 depicts a flow diagram of an example method (200) for improving the uniformity of a tire according to example aspects of the present disclosure. FIG. 2 depicts steps performed in a particular order for purposes of illustration and discussion. Those of ordinary skill in the art, using the disclosures provided herein, will understand that any of the methods disclosed herein can be omitted, rearranged, expanded, adapted, and/or modified in various ways without deviating from the scope of the present disclosure.

At (202), the method includes obtaining a magnitude of a measured uniformity parameter for each tire in a set of one or more tires. The measured uniformity parameter can correspond to any suitable uniformity parameter. For instance, the uniformity measurements can correspond, for example, to such uniformity parameters as radial force variation (RFV), lateral force variation (LFV), tangential force variation (TFV), one or more harmonics thereof, and other parameters.

Each magnitude in the set of magnitudes can be derived from a measured uniformity parameter for each tire. For instance, uniformity measurements of a uniformity parameter can be obtained for a plurality of discrete data points (e.g. 128 data points) about the tire using a uniformity measurement machine. The uniformity measurements can correspond to a uniformity waveform. The uniformity waveform can be decomposed into various harmonics (e.g. $1^{st}$ harmonic, $2^{nd}$ harmonic, etc.) using Fourier decomposition. Each harmonic can be associated with a magnitude (e.g. peak-to-peak amplitude) and/or a phase angle. The phase angle can be indicative of the location of the peak of the harmonic about the azimuth of the tire. In certain embodiments, phase angle information is not required to identify data indicative of a measurement error attributable to one or more measurement process harmonics according to example aspects of the present disclosure.

In one embodiment, the magnitude(s) can be previously derived from the measured uniformity parameters and stored in a memory. Obtaining the observed magnitudes can include accessing the observed magnitudes stored in the memory. In another embodiment, obtaining the observed magnitudes can include computing the observed magnitudes from measured uniformity parameters in conjunction with measuring the uniformity parameters with a uniformity measurement machine.

The number of tires in the set of tires can be selected to provide a proper sample for identification of a measurement error attributable to a measurement process harmonic according to example aspects of the present disclosure. For instance, in one particular implementation, the number of tires can be in the range of 10 to 100 tires. The uniformity measurements can be accessed from a database of historical uniformity data obtained for a set of test tires stored, for instance, in a memory device or can be physically measured using a set of test tires.

At (204), the method includes transforming the magnitudes to obtain a set of transformed magnitudes. The magnitudes can be transformed in accordance with a probability distribution function, such as a Weibull distribution function, such that parameters of a probability distribution function can be estimated from the transformed magnitudes. Aspects of the present disclosure are discussed with reference to a Weibull probability distribution. Those of ordinary skill in the art, using the disclosures provided herein, will understand that aspects of the present disclosure can be implemented using other suitable probability distributions without deviating from the scope of the present disclosure.

Figure 3:
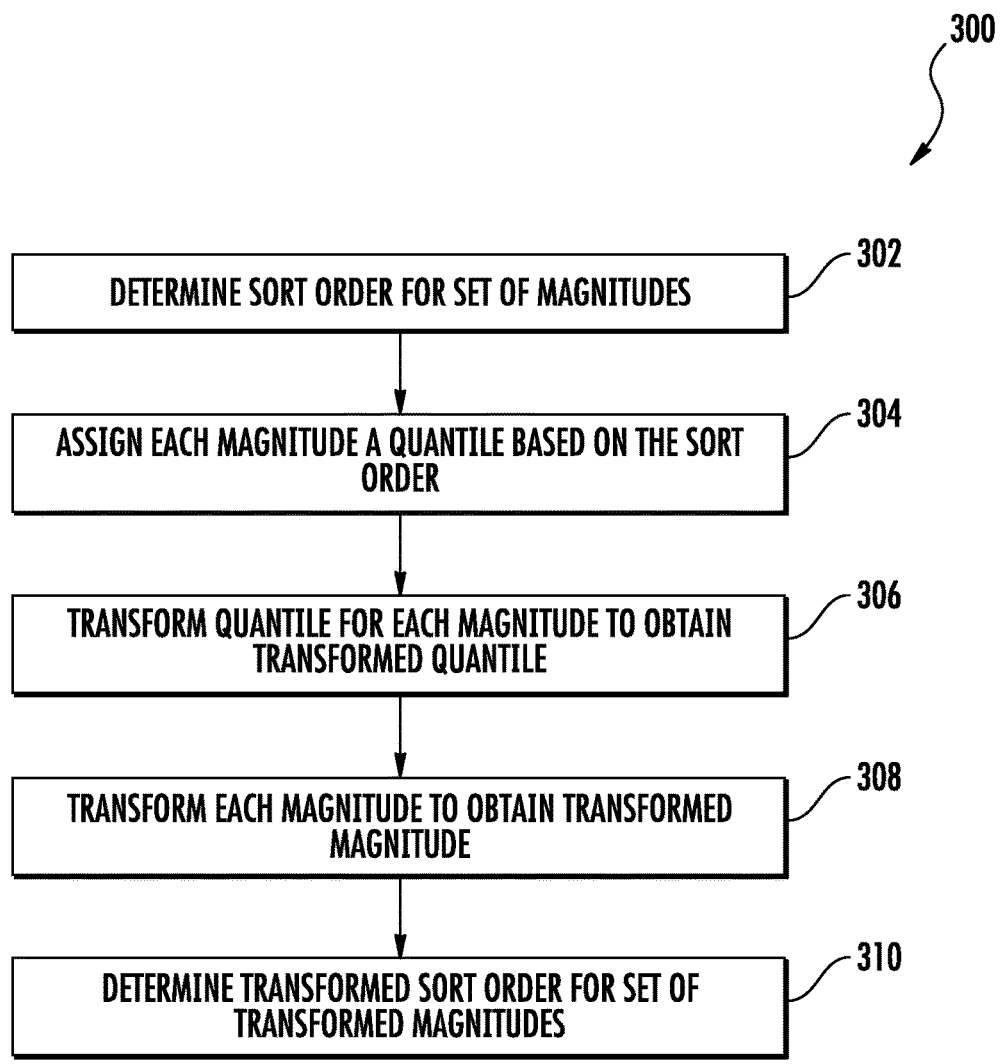
FIG. 3 depicts a flow diagram of an example method for transforming magnitudes to obtain a set of transformed magnitudes according to example aspects of the present disclosure.

FIG. 3 depicts a flow diagram of an example method (300) for transforming the magnitudes to obtain a set of transformed magnitudes according to example aspects of the present disclosure. At (302), a sort order for the set of magnitudes is determined. For instance, the set of magnitudes can be sorted from the least magnitude to the greatest magnitude with higher magnitudes being assigned a higher sort order. Table 1 provides an example sort order for a set of magnitudes of radial force variation associated with a set of 10 tires.

TABLE 1

| Sort Order | Magnitude |
| --- | --- |
| 1 | 1.45 |
| 2 | 3.52 |
| 3 | 5.11 |
| 4 | 5.82 |
| 5 | 6.79 |
| 6 | 7.57 |
| 7 | 10.45 |
| 8 | 12.16 |
| 9 | 14.12 |
| 10 | 17.54 |

At (304), each magnitude is assigned a quantile based at least in part on the sort order. In one embodiment, the quantile for a magnitude can be defined as follows:

$$q=(s-0.1)/n$$

where q is the quantile for the magnitude, s is the sort order of the magnitude in the set of magnitudes, and n is the number of magnitudes in the set of magnitudes n. Other modifications of this transform are possible.

At (306), the quantile for each magnitude is transformed in accordance with the distribution function to generate a transformed quantile. In one example embodiment, the quantile is transformed in accordance with the probability distribution as follows:

$$q_t = \log(\log(1/(1-q)))$$

where $q_t$ is the transformed quantile and q is the quantile.

At (308), each magnitude is transformed into a transformed magnitude. For instance, each transformed magnitude can be obtained for each magnitude as follows:

$$m_t = \log m$$

where $m_t$ is the transformed magnitude and m is the magnitude. All logarithms discussed herein can be natural logarithms or other suitable logarithms.

At (310), a transformed sort order is determined for the transformed magnitudes based on the transformed quantiles. For instance, the transformed magnitudes can be ordered based at least in part on the transformed quantiles associated with the transformed magnitudes. Table 2 provides an example transformed sort order for the set of transformed magnitudes corresponding to the magnitudes provided in Table 1.

TABLE 2

| Transformed Quantile | Transformed Magnitude |
| --- | --- |
| −2.36 | 0.37 |
| −1.56 | 1.26 |
| −1.07 | 1.63 |
| −0.7 | 1.76 |
| −0.4 | 1.91 |
| −0.11 | 2.02 |
| 0.16 | 2.35 |
| 0.45 | 2.50 |
| 0.79 | 2.65 |
| 1.53 | 2.86 |

Figure 4:
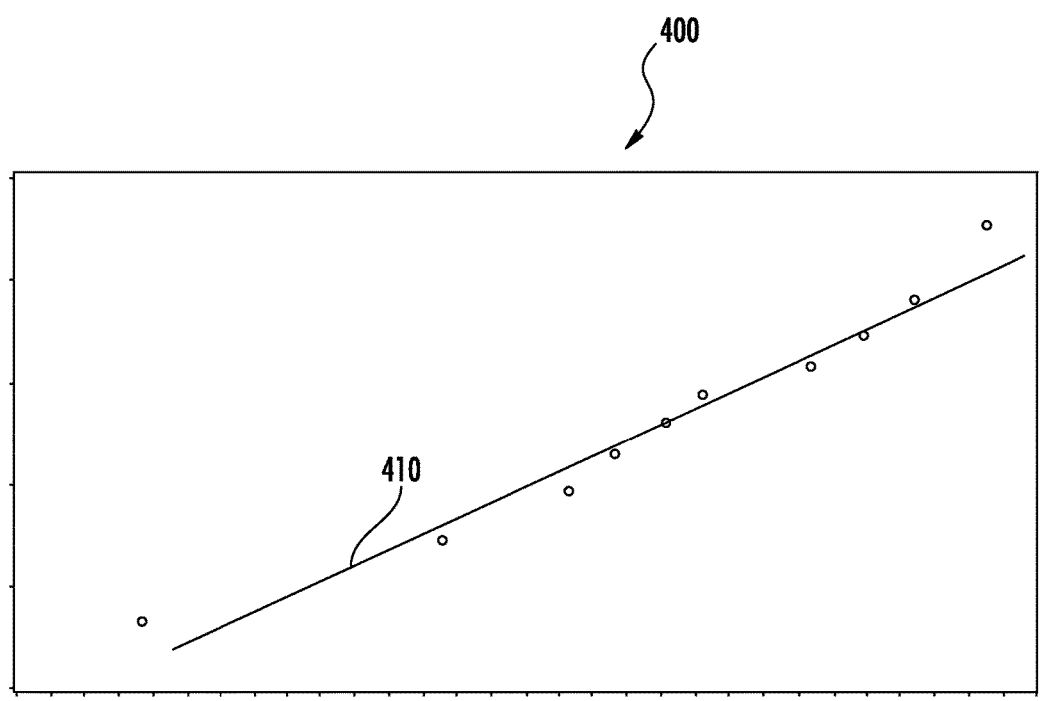
FIG. 4 depicts an example set of transformed magnitudes according to example aspects of the present disclosure.

The set of transformed magnitudes according to example aspects of the present disclosure can have a generally linear relationship. For instance, FIG. 4 depicts the distribution 400 of transformed magnitudes of Table 2. FIG. 4 plots transformed quantile along the abscissa and transformed magnitude along the ordinate. As demonstrated in FIG. 4, the distribution 400 of transformed magnitudes has a generally linear relationship. Characteristics of the linear relationship can be used to identify one or more parameters associated with the probability distribution.

Referring back to FIG. 2 at (206), one or more parameters of a probability distribution (e.g. a Weibull distribution) can be estimated based at least in part on the transformed magnitudes. For instance, a scale parameter and a shape parameter associated with a Weibull distribution can be estimated based at least in part on the transformed magnitudes.

Figure 5:
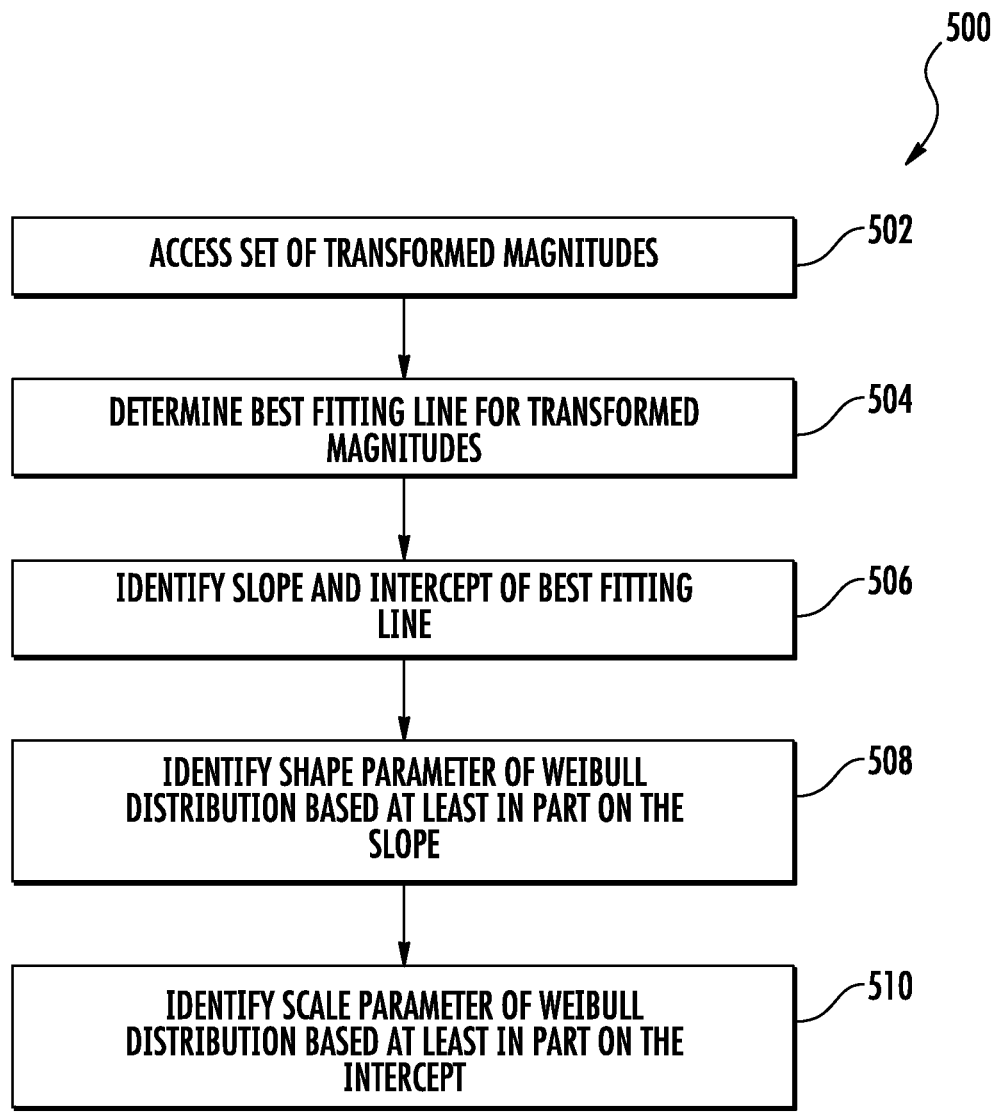
FIG. 5 depicts a flow diagram of an example method for determining one or more parameters of a probability distribution based at least in part on the transformed magnitudes according to example aspects of the present disclosure.

FIG. 5 depicts a flow diagram of an example method (500) for estimating parameters of a Weibull distribution based at least in part on the transformed magnitudes according to example aspects of the present disclosure. At (502), a set of transformed magnitudes is accessed. For instance, the distribution 400 of transformed magnitudes 400 depicted in FIG. 4 can be accessed. At (504) of FIG. 5, a best fitting line is determined for the transformed magnitudes using, for instance, a regression analysis. FIG. 4 depicts an example best fitting line 410 determined for example distribution 400 of transformed magnitudes.

At (506) of FIG. 5, a slope and an intercept (e.g. a y-intercept) is identified for the best fitting line. The parameters of the Weibull distribution can be estimated based at least in part on the slope and intercept. More particularly at (508) of FIG. 5, the shape parameter of the Weibull distribution can be identified based at least in part on the slope of the best fitting line. In one example implementation, the shape parameter is equal to the slope of the best fitting line. At (510), the scale parameter of the Weibull distribution can be estimated based at least in part on the slope and intercept of the best fitting line. In one example implementation, the scale parameter is identified as follows:

$$\alpha = e^{\frac{-intercept}{slope}}$$

where $\alpha$ is the scale parameter.

Referring back to FIG. 2 at (208), the method (200) includes estimating a measurement error attributable to a measurement process harmonic based at least in part on the parameters associated with the probability distribution. More particularly, a departure of the estimated parameters associated with the probability distribution from an expected baseline set of parameters associated with a baseline distribution can be indicative of a measurement error in the magnitudes. For instance, a baseline Weibull distribution associated with tire uniformity can have a baseline shape parameter and a baseline scale parameter. The shape parameter estimated according to example aspects of the present disclosure can be compared to the baseline shape parameter to determine the existence of a measurement error attributable to a measurement process harmonic.

In one particular implementation, the measurement error attributable to the measurement process harmonic can be quantified by identifying a variance associated with the measurement error. The variance associated with the measurement error can be identified based on the relationship between bias in the shape parameter of the distribution of transformed magnitudes. Using this relationship, the variance can be computed based at least in part on the shape parameter as follows:

$$\sigma_u^2 = \sigma_w^2 \left(\frac{\beta}{2} - 1\right)$$

where $\sigma_u$ is the variance attributable to the measurement error, $\sigma_w$ is a variance attributable to a baseline Weibull distribution of magnitudes, and $\beta$ is the estimated shape parameter.

The variance attributable to the measurement error can be used to determine one or more parameters associated with a measurement process harmonic, such as a magnitude and frequency (e.g. harmonic number) of the measurement process harmonic. For instance, one or more parameters associated with the measurement process harmonic can be identified based at least in part on the variance using, for instance, a look up table or model correlating the variance with the magnitude and/or frequency of the measurement process harmonic.

At (210), tire manufacture can be modified based at least in part on the measurement error to improve tire uniformity. For example, uniformity measurements for one or more tires can be corrected using the one or more parameters identified for the measurement process harmonic. For instance, a distribution of uniformity measurements can be adjusted to have a corrected variance determined based at least in part on the variance attributable to the measurement process harmonic.

Tire manufacture can then be modified based at least in part on the corrected uniformity measurements. For instance, the tire manufacture can be modified by sorting and/or grading tires based at least in part on the corrected uniformity measurements. As another example, tire manufacture can be modified by determining the need for corrective actions (e.g. grinding, ablation, etc.) based on the corrected uniformity measurements. As yet another example, tire harmonics and other process harmonics can be identified from the corrected uniformity measurements to provide information to the production system for process control and improvement activities Example System for Improving the Uniformity of a Tire Referring now to FIG. 6, a schematic overview of example system components for implementing the above-described methods is illustrated. An example tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, . . . , 602n in FIG. 6 and combine to form example tire 600. It should be appreciated that a batch of multiple tires can be constructed from one iteration of the various processes 602a through 602n.

Figure 6:
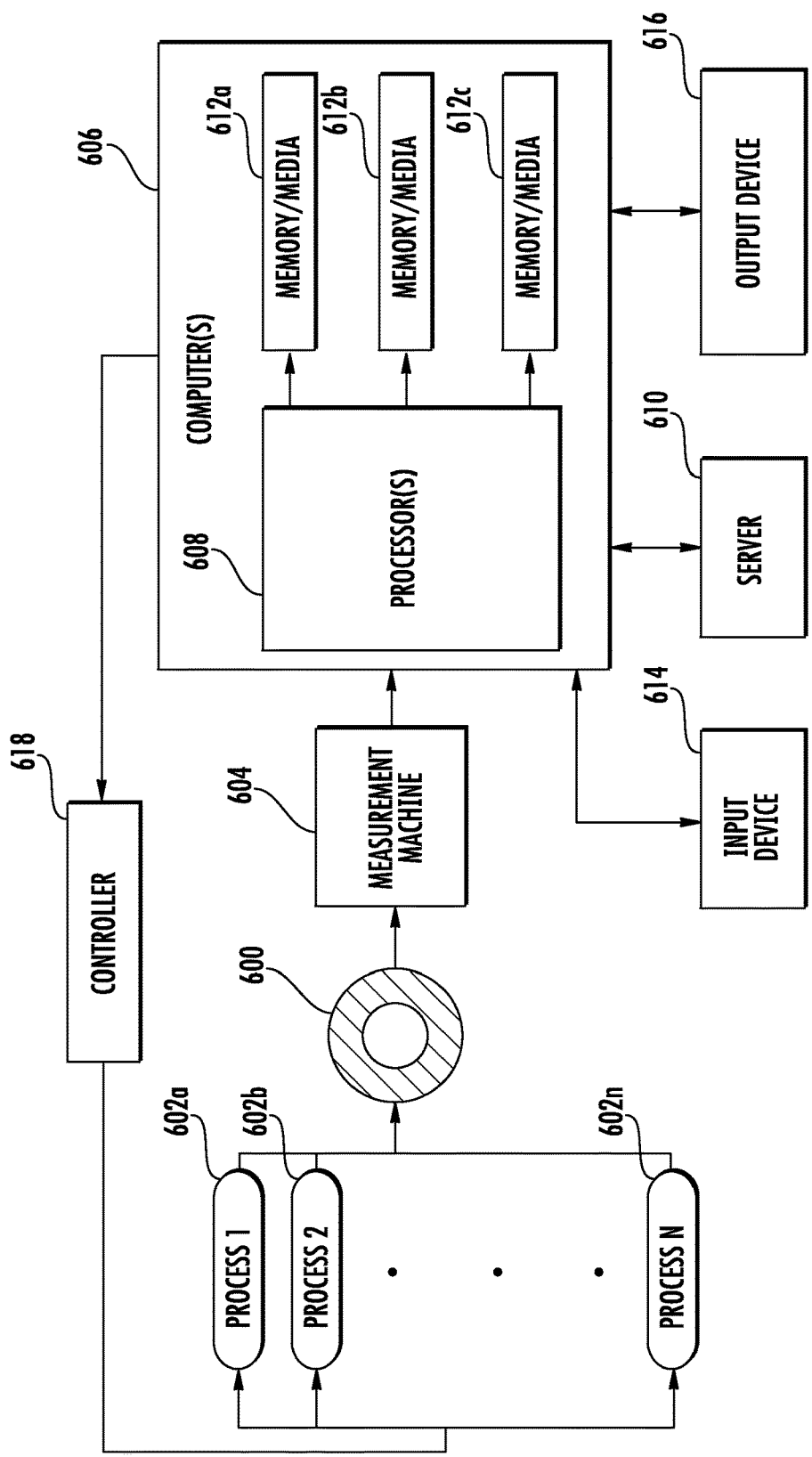
FIG. 6 depicts an example system for improving tire uniformity according to example aspects of the present disclosure.

Referring still to FIG. 6, a measurement machine 604 is provided to obtain the uniformity measurements of the tire 600. The uniformity measurement machine 604 can be configured to measure uniformity parameters such as radial force variation, lateral force variation, tangential force variation, radial run out, lateral run out, and other uniformity parameters of the tire 600. The uniformity measurement machine 604 can also include a road wheel used to load the tire to obtain force measurements as the tire 600 is rotated.

The measurements obtained by measurement machine 604 can be relayed such that they are received at one or more computing devices 606, which may respectively contain one or more processors 608, although only one computer and processor are shown in FIG. 6 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 6 can be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in one or more of the memory elements 612a, 612b, and 612c to cause the processor to perform operations. The operations can include identifying a measurement error attributable to one or more measurement process harmonics according to example aspects of the present disclosure disclosed herein.

Simulation Results

A set of simulated magnitudes was generated in accordance with a Weibull distribution having a shape parameter of 2.0 and a scale parameter of 8.0. The simulated data is then compromised with random normal noise having a mean of 0.0 and a standard deviation of 0.5 to simulate a measurement error. The magnitudes were transformed according to example aspects of the present disclosure and a best fitting line was determined for the transformed magnitudes using a regression analysis. A slope and intercept were determined for the best fitting line. The slope and intercept were used to estimate a shape parameter for a Weibull distribution of 2.17 and a scale parameter for the Weibull distribution of 8.45. The deviation of the shape parameter 2.17 from the shape parameter 2.0 of the original Weibull distribution of magnitudes is indicative of the presence of a measurement error.

Example Results

A set of magnitudes for a plurality of tires were transformed according to example aspects of the present disclosure and a best fitting line was determined for the transformed magnitudes using a regression analysis. A slope and intercept were determined for the best fitting line. The slope and intercept were used to estimate a shape parameter for a Weibull distribution of 2.48 and a scale parameter for the Weibull distribution of 4.05. The measurement variance $\sigma_u$ was estimated from the Weibull distribution according to example aspects of the present disclosure as 0.711.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of improving the uniformity of a tire, comprising:
    obtaining, by one or more computing devices, a set of magnitudes of a uniformity parameter measured for a set of a plurality of tires, each magnitude being associated with one of the tires in the set of the plurality of tires;
    transforming, by the one or more computing devices; the set of magnitudes to generate a set of transformed magnitudes, the transformed magnitudes associated with a generally linear distribution;
    estimating, by the one or more computing devices, one or more parameters of a probability distribution from the transformed magnitudes based on one or more parameters associated with the generally linear distribution;
    determining, by the one or more computing devices, data indicative of a measurement error attributable to a measurement process harmonic based at least in part on the one or more parameters of the probability distribution; and
    modifying tire manufacture based at least in part on the data indicative of the measurement error.

2. The method of claim 1, wherein the probability distribution is a Weibull distribution.

3. The method of claim 1, wherein transforming, by the one or more computing devices, the set of magnitudes to generate a set of transformed magnitudes, comprises:
    determining a sort order for the set of magnitudes;
    assigning each magnitude in the set of magnitudes a quantile based at least in part on the sort order for the set of magnitudes;
    transforming the quantile for each magnitude in the set of magnitudes in accordance with the probability distribution to generate a transformed quantile;
    transforming each magnitude in the set of magnitudes to generate a transformed magnitude for each transformed quantile;
    determining a transformed sort order based at least in part on the transformed quantile for each transformed magnitude.

4. The method of claim 3, wherein the quantile for each magnitude is transformed in accordance with the probability distribution as follows:

$$q_t = \log(\log(1/(1-/q)))$$

where $q_t$ is the transformed quantile and $q$ is the quantile; and
each transformed magnitude is obtained from each magnitude as follows:

$$m_t = \log m$$

where $m_t$ is the transformed magnitude and $m$ is the magnitude.

5. The method of claim 1, wherein estimating, by the one or more computing devices, one or more parameters of a probability distribution comprises:
    estimating a slope and an intercept of a best fitting line to the generally linear distribution; and
    determining the one or more parameters of a Weibull distribution based at least in part on the slope and the intercept.

6. The method of claim 5, wherein the one or more parameters of the Weibull distribution comprise a shape parameter and a scale parameter of the Weibull distribution.

7. The method of claim 6, wherein the shape parameter is estimated based at least in part on the slope of the best fitting line and the scale parameter is estimated based at least in part on the intercept of the best fitting line.

8. The method of claim 7, wherein the data indicative of the measurement error comprises a variance attributable to the measurement process harmonic.

9. The method of claim 7, wherein the variance attributable to the measurement process harmonic is estimated based at least in part on the shape parameter of the Weibull distribution.

10. The method of claim 1, wherein modifying tire manufacture based at least in part on the data indicative of the measurement error comprises correcting uniformity measurements for one or more tires based at least in part on the data indicative of the measurement error to determine corrected uniformity measurements for the one or more tires.

11. The method of claim 10, wherein modifying tire manufacture comprises sorting or grading the one or more tires based at least in part on the corrected uniformity measurements.

12. The method of claim 10, wherein modifying tire manufacture comprises analyzing the corrected uniformity measurements of the one or more tires to identify one or more process harmonics or tire harmonics.

13. The method of claim 1, wherein the uniformity parameter comprises one or more of low and high speed radial force variation, tangential force variation, radial run out, lateral run out, mass variance, conicity, ply steer, and one or more harmonics thereof.

14. A system for improving the uniformity of tires, comprising:
    a uniformity measurement machine configured to obtain uniformity measurements of a uniformity parameter for a set of a plurality tires;
    one or more computing devices in communication with the uniformity measurement machine, the one or more computing devices comprising computer-readable instructions stored in one or more memory devices that when executed by one or more processors, cause the one or more processors to operations, the operations comprising:
    obtaining a set of magnitudes of a uniformity parameter measured for a set of a plurality of tires, each magnitude being associated with one of the tires in the set of the plurality of tires;
    transforming the set of magnitudes to generate a set of transformed magnitudes, wherein the set of magnitudes are associated with a generally linear distribution;
    estimating one or more parameters of a probability distribution from the transformed magnitudes;
    determining data indicative of a measurement error attributable to a measurement process harmonic based at least in part on the one or more parameters of the probability distribution.

* * * * *